Patented Apr. 13, 1948

2,439,386

UNITED STATES PATENT OFFICE 2,439,386

PREPARATION OF QUINAZOLONES

Alfred Guenther, Riegelsville, Pa., and Jack F. Morgan, Phillipsburg, N. J., assignors to General Aniline & Film Corporation, New York, N. Y., a corporation of Delaware No Drawing. Application April 7, 1945,
Serial No. 587,212

11 Claims. (Cl. 260—251)

The present invention relates to the preparation of substituted quinazolones and to such quinazolones.

It has been suggested that quinazolones be prepared by the interaction of acylanthranils with amines. While this method can be operated to give good yields, it nevertheless requires the employment of intermediates which are highly unstable with respect to moisture. Consequently, considerable care must be exercised in the handling of the intermediates if satisfactory yields are to be obtained.

Most of the other methods which have been employed for the production of quinazolones require the use of such high temperatures as necessarily cause some decomposition of the reactants. For example, 2-methyl-3-phenyl-4-quinazolone has been prepared by heating o-acetamido-benzanilide to temperatures of 175 to 210° C. These procedures suffer from the disadvantages that the decomposition involved not only lowers the yield but through by-product formation decreases the purity of the desired end product.

It has now been discovered that substituted quinazolones can be prepared while avoiding the disadvantages of the prior art methods by the reaction of common stable starting materials. The common stable starting materials are N-acyl-o-amino cyclic carboxylic acids, primary amines, and phosphorus trichloride or phosphorus oxychloride. These products react together smoothly at moderately elevated temperatures to produce the desired quinazolones in a pure condition and in good yields. The preparation of the quinazolones while employing these starting materials and the quinazolones so obtained accordingly constitute the purposes and objects of the present invention.

The quinazolones the production of which is contemplated herein have the following structural formula:

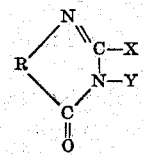

in which R is an aromatic or heterocyclic nucleus which may be substituted by monovalent groups, for example, nitro, halogen, such as chlorine, bromine and the like, alkyl such as methyl, ethyl, propyl, butyl, amyl, lauryl, stearyl and the like, akoxy such as methoxy, ethoxy, propoxy and the like, X is alkyl as above and Y is an aliphatic radical such as alkyl as above and alkylamino such as methylamino, ethylamino and the like, an aromatic radical such as phenyl, toluyl, anisyl, phenetyl, o-nitrophenyl, m-nitrophenyl, p-nitrophenyl, p-chlorophenyl, naphthyl, phenylamino and the like, or araliphatic such as benzyl, menaphthyl and the like. Where Y is alkylamino or phenylamino, the alkyl or phenyl radical will be separated from the quinazolone nitrogen by an —NH— group, whereas when R is aralkyl, the aryl radical thereof will be separated from the quinazolone nitrogen by a —CH$_2$ group. The aromatic or heterocyclic nucleus represented by the character R may be benzene, naphthalene, anthracene, anthraquinone, dibenzofurane, carbazole, diphenylene sulfide and the like.

The reaction may be carried out by heating the N-acyl-o-amino-cyclic carboxylic acid with the primary amine in a suitable solvent in the presence of phosphorus trichloride or phosphorus oxychloride. The phosphorus chloride, preferably diluted with a small amount of the solvent employed, is added slowly and portionwise to the solution of the other components. The degree of heating to effect the reaction will depend on the nature of the reactants. Preferably, the temperature is one at which the reaction mixture refluxes, although lower temperatures may be employed.

The N-acyl amino cyclic carboxylic acids employed may be represented by the following formula:

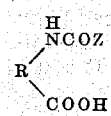

in which Z is alkyl such as methyl, ethyl, propyl, butyl, amyl, octyl, decyl and the like, and R has the values given above, the amide group and the carboxylic acid group being in o-position of the nucleus represented by R. Examples of such compounds are:

N-acetyl anthranilic acid
N-acetyl-5-chloro anthranilic acid
N-propionyl anthranilic acid
N-butyryl anthranilic acid
N-acetyl-o-amino naphthoic acid
N-acetyl-5-nitro anthranilic acid
N-acetyl-6-methyl anthranilic acid
N-acetyl-5-ethoxy anthranilic acid and the like.

The amines which are to be reacted with the acylamino carboxylic acids must contain a primary amino group and must be either aliphatic, aromatic or araliphatic. The aromatic amines may be substituted by monovalent substituents of the type hereinabove referred to, such as halogen, nitro, alkyl and alkoxy. Suitable aliphatic amines are methyl amine, ethyl amine, butyl amine, octyl amine, lauryl amine, stearyl amine, methyl hydrazine, ethyl hydrazine and the like. If the aromatic amine employed contains a condensed ring system such as a naphthyl radical, the amino group should appear in the β- rather than in the α-position thereof. Thus it has been found that whereas β-naphthylamine reacts to give a high yield of a quinazolone, α-naphthylamine is nonreactive. Suitable aromatic amines are aniline, p-toluidine, p-anisidine, p-phenetidine, o-nitro-aniline, m-nitraniline, p-nitraniline, p-chloroaniline, β-naphthylamine, phenyl hydrazine and the like. Benzylamine and menaphthylamine are representative examples of the aralkyl amines.

The solvents used should be inert to the reactants and should be normally liquid. As solvents there may be employed normally liquid aromatic hydrocarbons such as benzene, toluene and the like, the chlor derivatives thereof, such as monochlor benzene, monochlor toluene and the like, normally liquid aliphatic hydrocarbons such as octane, solvent naphtha, kerosene, and their chloro derivatives such as ethylene chloride, butyl chloride and chlorkerosene, and normally liquid nitrogenous heterocyclic bases such as pyridine, quinoline and the like.

The reaction by which the substituted quinazolones are produced, assuming that the N-acyl-o-amino carboxylic acid is N-acetyl anthranilic acid, and that the primary amine is aniline, may be graphically represented as follows:

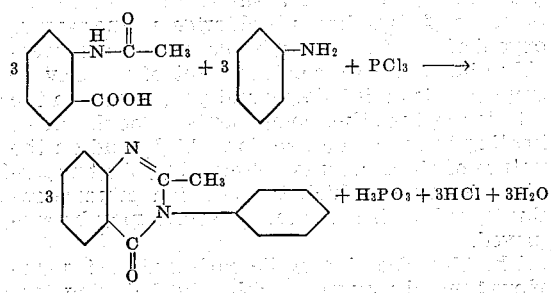

It will be seen that according to this reaction 3 mols of the N-acetyl anthranilic acid and 3 mols of aniline are used for each mol of phosphorus trichloride. It is an interesting fact that although the amount of phosphorus trichloride employed can combine with only half the water formed, all of the water is nevertheless removed. Proceeding from this observation, attempts were made to increase the yield of the substituted quinazolone by increasing the quantity of phosphorus trichloride used, on the theory that greater amounts of phosphorus trichloride would facilitate removal of water and increase the amount of the quinazolone produced. However, even when the amount of phosphorus trichloride was doubled, there was no increase in yield and in fact the increased amount of phosphorus trichloride was found in some cases to be detrimental, since it tended to give products of lower purity.

The equation accordingly fixes the upper limit of the quantity of phosphorus chloride employed. Smaller quantities of the phosphorus trichloride or phosphorus oxychloride amounting to about ⅓ of a mol of the phosphorus chloride for each mol of the N-acyl-o-amino carboxylic acid may be used while obtaining good results, but the reaction becomes progressively more sluggish and the yields proportionately smaller. If the phosphorus chloride be eliminated entirely, no reaction takes place, from which it will be appreciated that the phosphorus trichloride or phosphorus oxychloride in the amounts given is a prerequisite to the successful conversion of the reactants into the substituted quinazolones. The acylamino carboxylic acids and the amines are used in molar proportions, by which is meant that roughly for each mol of the acylamino carboxylic acid there will be employed 1 mol of the amine.

The substituted quinazolones of the present invention may be utilized as intermediates in the formation of dyestuffs.

The following examples serve to further illustrate the invention, but it is to be understood that these examples are illustrative and not limitative in nature. The parts are by weight.

*Example I.—2-methyl-3-p-chlorophenyl-4-quinazolone*

12.75 parts of p-chloroaniline, 17.9 parts of N-acetyl anthranilic acid and 160 parts of toluene are agitated and slowly treated dropwise with 4.6 parts of phosphorus trichloride in 20 parts of toluene. A white suspension forms and remains throughout the reaction. The mixture is heated to the reflux temperature and agitated for 1 to 2 hours. After treating with 200 parts of 10% sodium carbonate solution, the toluene is removed by steam distillation. The white solid is removed by filtration, washed with water and dried. There are obtained 21.6 parts of crude product melting at 155 to 158° C. This represents 80% of the theoretical yield. After recrystallization from alcohol, the melting point was found to be 157 to 158° C.

Analysis:

|   | Calcd. | Found |
|---|---|---|
| C | 66.5 | 66.74 |
| H | 4.10 | 4.14 |
| N | 10.35 | 10.52 |

A benzo substituted 2-methyl-3-p-chlorophenyl-4-quinazolone was obtained while operating as above but while using N-acetyl-o-amino naphthoic acid in place of the N-acetyl anthranilic acid. This product has the following formula

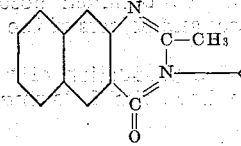

and is 2-methyl-3-p-chloro-phenyl-6,7-benzo-quinazolone.

*Example II.—2-methyl-3-lauryl-4-quinazolone*

13 parts of laurylamine, 12.53 parts of N-acetyl-anthranilic acid and 120 parts of toluene are agitated and treated dropwise with 3.25 parts of phosphorus trichloride in 20 parts of toluene. The mixture is heated to the reflux temperature and agitated at this temperature for 1 to 2 hours. After heating with 200 parts of 10% sodium carbonate solution the toluene is removed by distillation in steam. The crude product remains as an oil. On cooling, the oil crystallizes and is removed by filtration, washed and dried. There result 15.6 parts (68% of theory) of a product melting at 85–88° C. After recrystallization from alcohol, the 2-methyl-3-lauryl-4-quinazolone melts at 90–92° C.

Analysis:

|   | Calcd. | Found |
|---|---|---|
| N | 8.53 | 8.33 |

*Example III.—2-methyl-3-phenyl-6-chloro-4-quinazolone*

19.2 parts of N-acetyl-5-chloroanthranilic acid, 8.4 parts of aniline and 140 parts of toluene are agitated and slowly treated dropwise with 4.2 parts of phosphorus trichloride in 20 parts of toluene. The suspension is well stirred, heated to reflux and maintained at the reflux temperature for 1 to 2 hours. After adding 200 parts of 10% sodium carbonate the toluene is removed by steam distillation. The solids formed are removed by filtration, washed with water and dried. There result 14.9 parts (61% of theory) of crude product melting at 173 to 177° C. After recrystallization from alcohol, the 2-methyl-3-phenyl-6-chloro-4-quinazolone melts at 181 to 182° C.

Analysis:

|   | Calcd. | Found |
|---|---|---|
| C | 66.55 | 66.06 |
| H | 4.10 | 4.13 |
| N | 10.35 | 10.24 |

*Example IV.—2-methyl-3-anilino-4-quinazolone*

17.9 parts of N-acetylanthranilic acid, 10.8 parts of phenylhydrazine and 140 parts of toluene are agitated and slowly treated with a solution of 4.6 parts of phosphorus trichloride in 20 parts of toluene. The resulting suspension is stirred, heated to the reflux temperature and maintained at this temperature for 1 to 2 hours. After adding 200 parts of 10% sodium carbonate, the toluene is removed by steam distillation. The solid remaining in the boiler is removed by filtration, washed with water and dried. There is obtained 15.8 parts of pure 2-methyl-3-anilino-4-quinazolone melting at 207 to 209° C. This represents a yield equivalent to 63% of the theoretical.

*Example V.—2-methyl-3-o-nitro-phenyl-4-quinazolone*

The procedure is the same as in Example I excepting that there are used 13.8 parts of a-nitro-aniline in lieu of the p-chloro-aniline.

Various modifications of our invention will occur to persons skilled in the art and we therefore do not intend to be limited in the patent granted except as required by the prior art and the appended claims.

We claim:

1. The process of preparing substituted 4-quinazolones which comprises heating an N-acyl-o-amino cyclic carboxylic acid selected from the class consisting of aromatic and heterocyclic carboxylic acids with a primary amine selected from the class consisting of primary aliphatic, aromatic and araliphatic amines, the aromatic amine when containing a condensed ring system bearing the amino group in the β-position thereof, in the presence of a phosphorus chloride selected from the class consisting of phosphorus trichloride and phosphorus oxychloride.

2. The process of preparing substituted 4-quinazolones which comprises heating a mixture of an N-acyl-o-amino-cyclic carboxylic acid selected from the class consisting of aromatic and heterocyclic carboxylic acids with a primary amine selected from the class consisting of primary aliphatic, aromatic and araliphatic amines, the aromatic amine when containing a condensed ring system bearing the amino group in the β-position thereof, in the presence of a phosphorus chloride selected from the class consisting of phosphorus trichloride and phosphorus oxychloride and a normally liquid inert organic solvent.

3. The process as defined in claim 2 wherein said solvent is an aromatic hydrocarbon.

4. The process as defined in claim 2 wherein the reactants are heated to the refluxing temperature of the solvent.

5. The process as defined in claim 2 wherein the inert solvent is toluene and wherein the reactants are heated to the refluxing temperature of the solvent.

6. The process as defined in claim 1 wherein the N-acyl-o-amino-cyclic carboxylic acid is of the benzene series and the primary amine is aliphatic.

7. The process as defined in claim 1 wherein the N-acyl-o-amino-cyclic carboxylic acid is of the benzene series and the primary amine is aromatic.

8. The process as defined in claim 1 wherein for each mol of the N-acyl-o-amino-carboxylic acid and of the primary amine there is used ⅓ of a mol of said phosphorus chloride.

9. The process of preparing 2-methyl-3-phenyl-6-chloro-4-quinazolone which comprises refluxing N-acetyl-5-chloro anthranilic acid and aniline in toluene in the presence of phosphorus trichloride.

10. The process of preparing 2-methyl-3-lauryl-4-quinazolone by refluxing N-acetyl anthranilic acid and lauryl amine in toluene in the presence of phosphorus trichloride.

11. The process of preparing 2-methyl-3-anilino-4-quinazolone which comprises refluxing N-acetyl anthranilic acid and phenyl hydrazine in toluene in the presence of phosphorus trichloride.

ALFRED GUENTHER.
JACK F. MORGAN.

REFERENCES CITED

The following references are of record in the file of this patent:

UNITED STATES PATENTS

| Number | Name | Date |
|---|---|---|
| 2,089,971 | Lesser | Aug. 17, 1937 |
| 2,090,603 | Winkelmuller | Aug. 17, 1937 |

OTHER REFERENCES

Jour. für Praktische Chemi (2), vol. 36; page 165.

Jour. Am. Chemical Society, vol. 34, pages 199, 527, 519.